United States Patent
Palmisano et al.

(10) Patent No.: US 7,000,404 B2
(45) Date of Patent: Feb. 21, 2006

(54) HEAT EXCHANGER ON A TURBINE COOLING CIRCUIT

(75) Inventors: Laurent Palmisano, Yerres (FR); Laurent Jablonski, Melun (FR)

(73) Assignee: Snecma Moteurs, Paris (FR)

( * ) Notice: Subject to any disclaimer, the term of this patent is extended or adjusted under 35 U.S.C. 154(b) by 5 days.

(21) Appl. No.: 10/900,111

(22) Filed: Jul. 28, 2004

(65) Prior Publication Data

US 2005/0022535 A1    Feb. 3, 2005

(30) Foreign Application Priority Data

Jul. 28, 2003  (FR) .................................. 03 09219

(51) Int. Cl.
*F02C 7/12*  (2006.01)

(52) U.S. Cl. .............................. 60/782; 60/728; 60/806
(58) Field of Classification Search .................. 60/782, 60/728, 736, 806, 726; 416/193 R; 415/115, 415/116
See application file for complete search history.

(56) References Cited

U.S. PATENT DOCUMENTS

| | | | |
|---|---|---|---|
| 4,120,150 A | 10/1978 | Wakeman | |
| 4,254,618 A | 3/1981 | Elovic | |
| 5,581,996 A * | 12/1996 | Koch et al. | .................... 60/782 |
| 5,619,855 A * | 4/1997 | Burrus | ......................... 60/736 |
| 5,918,458 A | 7/1999 | Coffinberry et al. | |
| 6,065,282 A * | 5/2000 | Fukue et al. | .............. 60/39.182 |
| 6,250,061 B1 * | 6/2001 | Orlando | ......................... 60/772 |
| 6,295,803 B1 * | 10/2001 | Bancalari | ................. 60/39.511 |
| 6,672,072 B1 * | 1/2004 | Giffin, III | ..................... 60/782 |

FOREIGN PATENT DOCUMENTS

GB        2 342 693         4/2000

* cited by examiner

*Primary Examiner*—Ehud Gartenberg
(74) *Attorney, Agent, or Firm*—Oblon, Spivak, McClelland, Maier & Neustadt, P.C.

(57) ABSTRACT

The invention relates to a method of supplying cooling air to the hot portions of a turbojet that comprises, from upstream to downstream: a compressor; a diffuser; a combustion chamber; a distributor; and a turbine driving said compressor, in which method a flow of air is bled from the flow of air delivered by the compressor, the bled-off flow is cooled in a heat exchanger situated radially outside the combustion chamber, and is then directed radially inwards via the stationary blades of the distributor and used for cooling the moving wheel of the turbine, the method wherein the flow of cooling air is bled from the zone of the end of the combustion chamber that surrounds the diffuser, and wherein the stationary blades of the distributor are also cooled by a second flow of air bled from the diffuser.

4 Claims, 2 Drawing Sheets

HEAT EXCHANGER ON A TURBINE COOLING CIRCUIT

The invention relates to a field of turbojets, and more precisely to the field of cooling the hottest elements of turbojets.

BACKGROUND OF THE INVENTION

Considerable progress has been made in turbojets in terms of reducing fuel consumption and increasing specific power, by improving the thermodynamic cycle.

This improvement has been obtained in particular by increasing the pressure of the air fed to the combustion chamber, and by increasing the temperature at the inlet to the turbine.

However, increasing temperature and the inlet to the turbine requires the blades of the distributor and the blades of the first stage of the high pressure turbine that drives the high pressure compressor to be cooled energetically, since said blades are parts that are subjected to the highest temperatures and to high levels of stress. Such cooling is generally performed by bleeding a flow of air under pressure from the last stage of the high pressure compressor and passing it through the hot zones.

In modern turbojets, having a high compression ratio, the high pressures generated by the compressor, which are favorable for the thermodynamic efficiency of the engine, lead to a significant increase in the temperature of the air delivered to the combustion chamber. This increase in temperature at the outlet from the compressor requires the rate at which air is taken for cooling to be increased in order to cool the high pressure turbine, and that reduces thermodynamic efficiency.

In order to remedy that drawback, proposals have already been made to cool the bleed flow rate of air in a heat exchanger whose own cold fluid is constituted by cold air bled from the bypass flow, or by some other fluid such as fluid or oil.

U.S. Pat. No. 5,581,996 provides for bleeding air from the stream in the diffuser at the inlet to the combustion chamber. This bled-off air is cooled in a heat exchanger situated radially outside the combustion chamber, and is subsequently returned towards the inside of the engine via the blades of the distributor, thereby cooling them, and it also serves to cool the radially-inner portions of the combustion chamber, and possibly also the blades of the first stage of the turbine.

That document represents the state of the art closest to the invention since it provides for cooling the first wheel of the turbine by bleeding air from the outlet of the diffuser, which air is cooled in a heat exchanger and then, after being cooled, passes via the blades of the distributor.

Nevertheless, since air is taken in the radially-outer zone of the outlet stream from the compressor, there is a risk of the heat exchanger becoming clogged with dust blown out centrifugally. Furthermore, the cooled air passes via the blades of the distributor, and serves to cool the walls of said blades. This heats up the air and reduces the flow rate of air that can subsequently be used for cooling the blades of the turbine.

OBJECTS AND SUMMARY OF THE INVENTION

The object of the invention is to mitigate those drawbacks and to supply a cooler flow of air for cooling the moving blades of the turbine.

The invention thus provides a method of delivering cooling air to the hot portions of a turbojet that comprises, from upstream to downstream: a compressor; a diffuser; a combustion chamber; a distributor; and a turbine driving said compressor, in which method, a flow of air is bled from the flow of air delivered by the compressor, which bled-off flow is cooled in a heat exchanger situated radially outside the combustion chamber, and is then directed radially inwards via stationary blades of the distributor and used to cool the moving wheel of the turbine, wherein the cooling air flow is bled from the zone at the upstream end of the combustion chamber surrounding the diffuser, and wherein the stationary blades of the distributor are cooled by a second air flow bled from the downstream of said diffuser.

Thus, since the cooling air is bled from the zone at the end of the combustion chamber that surrounds the diffuser, this air contains a smaller quantity of particles, thus limiting clogging of the heat exchanger. In addition, since the blades of the distributor are cooled by a second flow of air bled from the end of the combustion chamber, the cooled air becomes heated to a smaller extent on passing through the distributor, and none of this air is lost therefrom.

According to an advantageous additional characteristic of the invention, a fraction of the flow of air passing through the distributor is channeled beneath the combustion chamber towards the last stage of the compressor in order to cool the cavity thereof.

This disposition serves to improve the lifetime of the high pressure compressor, in particular in turbojets for military use which can be subjected to very severe operating conditions over short durations.

The invention also provides a turbojet comprising, from upstream to downstream: a compressor; a diffuser; a combustion chamber; a distributor; and a turbine driving said compressor; the turbojet further comprising a first cooling circuit having means for bleeding air from the flow delivered by the compressor, a heat exchanger situated radially outside the combustion chamber, and means for directing the cooled air through the stationary blades of the distributor in order to cool the moving wheel of the turbine, wherein the bleed means bleed the flow of air from the zone of the end of the combustion chamber that surrounds the diffuser, and further comprising a second circuit for cooling the stationary blades of the distributor, which bleeds air from the diffuser.

Advantageously, the turbojet further includes a channel beneath the combustion chamber to bring a fraction of the flow of air passing through the distributor towards the last stage of the compressor.

BRIEF DESCRIPTION OF THE DRAWINGS

Other advantages and characteristics of the invention will appear on reading the following description made by way of example and with reference to the accompanying drawings, in which.

MORE DETAILED DESCRIPTION

Figure 1:
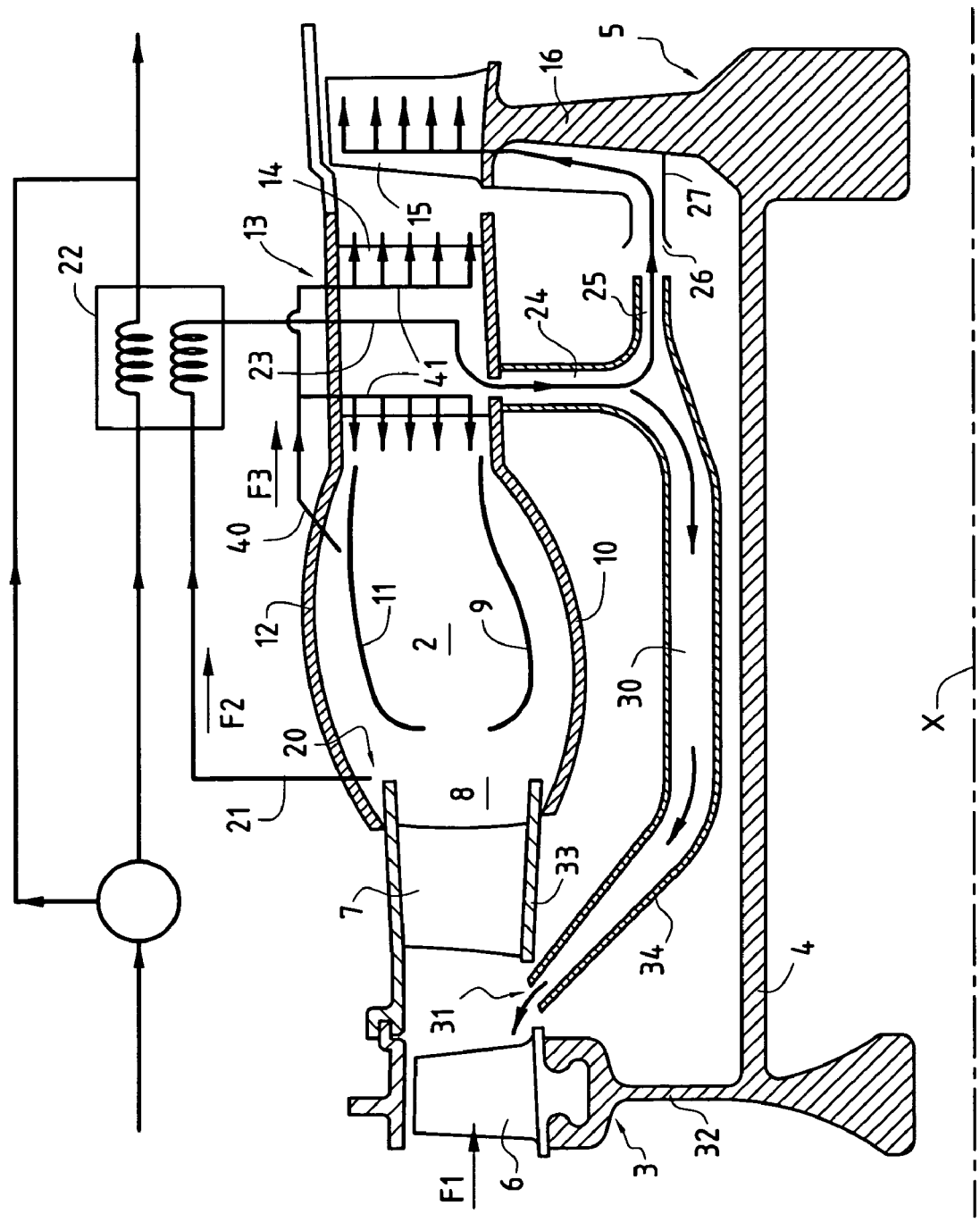
FIG. 1 is a fragmentary and diagrammatic view of the high pressure spool and the combustion chamber of a turbojet including means, in accordance with the invention, for cooling its hot zones.

The drawings show a portion of the high pressure spool of a turbojet of axis X, which comprises, upstream from an annular combustion chamber 2, a rotor of a compressor 3 (only the last stage of which is shown), which rotor is driven by means of a shaft 4 by a rotor of a turbine 5 (with only the first moving wheel of the turbine being shown).

In traditional manner, the last stage of the compressor rotor 3 carries a ring of moving blades 6 serving to compress the primary flow F1 flowing along an annular channel, and disposed upstream from a stationary ring of rectifying blades 7 which deliver the primary flow F1 into the combustion chamber 2 via a diffuser 8.

The annular combustion chamber 2 is defined by a radially-inner wall 9 situated radially outside an inner casing 10, and by a radially-outer wall 11 situated radially inside an outer casing 12.

The walls 9 and 11 are connected to the inner and outer casings 10 and 12 respectively at the inlet to a distributor 13 which comprises a plurality of rectifier blades 14 feeding the moving blades 15 of the first moving wheel 16 of the turbine rotor 5.

A fraction of the air flow F1 delivered by the diffuser 8 is used for burning fuel, which is delivered into the combustion chamber 2 by injectors that are not shown in FIG. 1. Another fraction of this air flows round the walls 9 and 11 of the combustion chamber 2 and serves to cool these walls which are subjected to high temperatures, and thus to cool the casings 10 and 12, prior to being introduced into the combustion chamber 2 via so-called "dilution" holes, or else it serves to cool the turbine stators and the turbine rotors.

The function of the diffuser 8 is to reduce the flow speed of the primary flow F1, thereby increasing its pressure at the entry to the combustion chamber 2.

According to the invention, a flow of air F2 is bled from the end of the combustion chamber in a zone 20 surrounding the diffuser 8. The flow F2 is directed radially outwards by at least one duct 21, passes through a heat exchanger 22, and returns radially towards the inside of the engine via channels 23 formed in the blades 14 of the distributor 13, thereby reaching an enclosure 24 disposed under the distributor 13, from which a fraction of the air flow F2 is directed towards injectors 25 disposed facing holes 26 formed in the upstream side wall 27 of the first moving wheel 16 of the turbine, so as to cool said wheel 16, and in particular so as to cool the blades 15 of the wheel.

The remaining portion of the flow F2 that is injected into the enclosure 24 can be used to cool other elements beneath the combustion chamber 2, and in particular the cavity of the last stage of the high pressure compressor 3.

Figure 2:
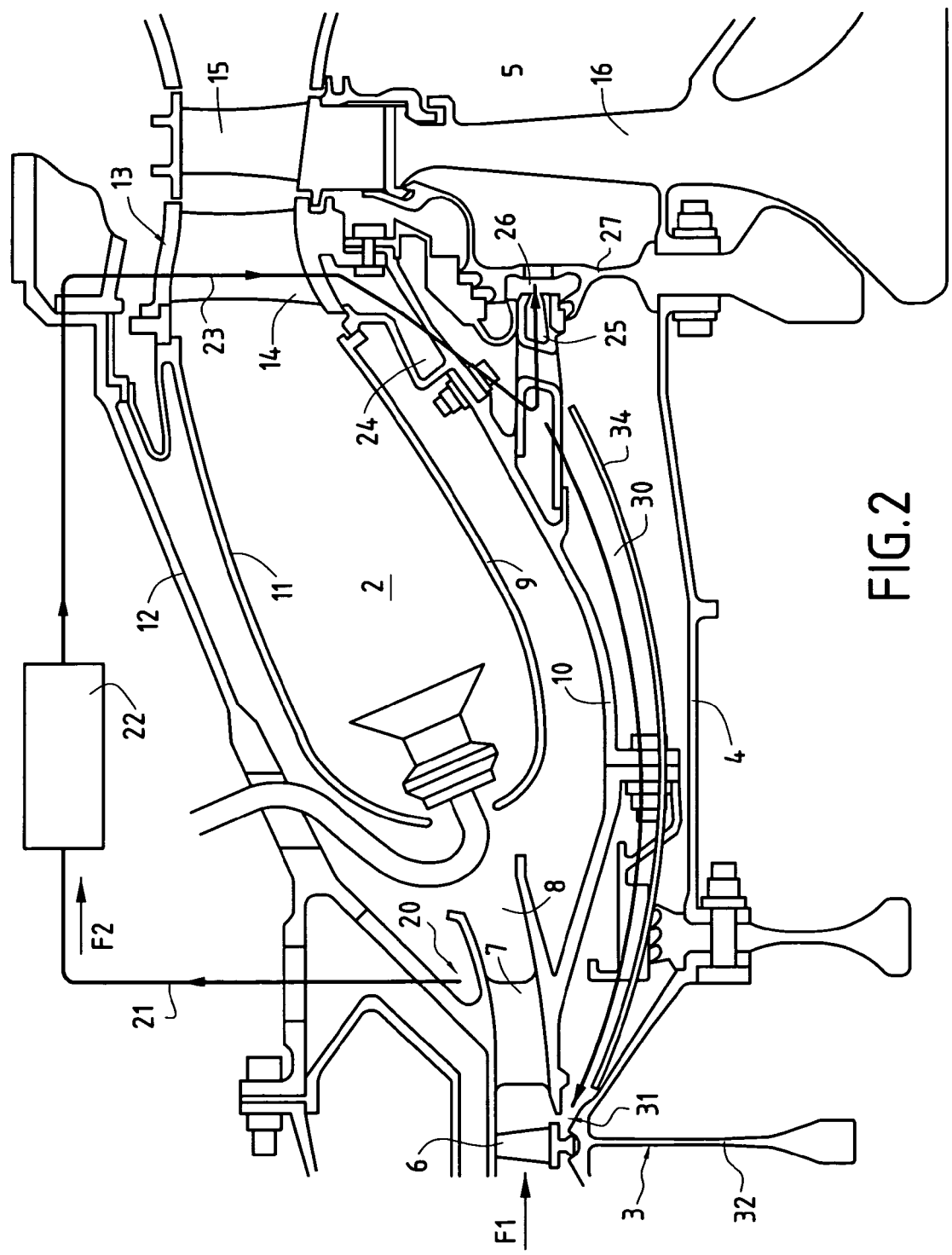
FIG. 2 is similar to FIG. 1 and shows a variant embodiment of the channel for transferring a fraction of the cooled air flow to the last stage of the high pressure compressor.

To this end, a stationary channel 30 connects the enclosure 24 to the zone 31 between the disk of the last stage of the compressor 3 and the inner casing 33 supporting the rectifier blades 7. This channel 30 may advantageously be annular and circularly symmetrical about the axis X, being defined radially on the outside by the inner casing 10, and radially on the inside by a shroud 34, as shown in FIG. 2. It could also be implemented in the form of a plurality of ducts extending upstream and distributed around the axis X.

According to another characteristic of the invention, shown in FIG. 1, the blades 14 of the distributor 13 are cooled by a second cooling circuit 40 which bleeds a flow of air F3 from the downstream zone of the space between the outer wall 11 and the outer casing 12, this flow of air F3 passing through channels 41 formed in the walls of the rectifier blades 14 and separate from the channels 23, leading to orifices opening out in the outside faces of the blades 14, in particular in the leading and trailing edges thereof.

By means of this disposition, no air is bled from the flow F2 in order to cool the blades 14 of the distributor 13, the distributor 13 being cooled essentially by the flow F3, and the flow F2 being subjected to heating to a lesser extent on passing along the blades 14.

The cooling fluid used in the heat exchanger 22 may be air taken with a scoop from the bypass flow of the turbojet. As a source of low temperature, it is also possible to use the air for controlling turbine clearance, or oil for the rear enclosures, and possibly also the fuel that is fed to the combustion chamber 2.

When the low temperature source of the heat exchanger 22 is bled from the bypass or secondary flow of a two-spool turbojet fitted with a fan, the flow rate of the air can be interrupted during stages of flight in which the heat exchanger is no longer needed, e.g. while cruising.

The cooling system of the present invention is particularly intended for turbojets in which the overall compression ratio is high. It also applies to turbojets for civilian use, having two spools, a bypass flow, and fitted with fans having a large dilution ratio, where the pressure of the air delivered to the combustion chamber 2 can reach 30 bars during takeoff. In such turbojets, the temperature of the compressed air can reach 700° C., and cooling the air that is bled off at this temperature is required throughout the critical stage of takeoff. Under cruising conditions, the temperature of the compressed air drops to close to 300° C., so it is no longer necessary to cool the air that has been bled off in the heat exchanger 22, thereby improving the overall efficiency of the engine under such conditions.

What is claimed is:

1. A method of delivering cooling air to the hot portions of a turbojet that comprises, from upstream to downstream: a compressor; a diffuser; a combustion chamber; a distributor; and a turbine driving said compressor, in which method, a flow of air is bled from the flow of air delivered by the compressor, which bled-off flow is cooled in a heat exchanger situated radially outside the combustion chamber, and is then directed radially inwards via stationary blades of the distributor and used to cool the moving wheel of the turbine,
   the method wherein the cooling air flow is bled from the zone at the upstream end of the combustion chamber surrounding the diffuser, and wherein the stationary blades of the distributor are cooled by a second air flow bled from the downstream of said diffuser.

2. A method according to claim 1, wherein a fraction of the flow of air passing through the distributor is channeled beneath the combustion chamber towards the last stage of the compressor in order to cool the cavity thereof.

3. A turbojet comprising, from upstream to downstream: a compressor; a diffuser; a combustion chamber; a distributor; and a turbine driving said compressor; the turbojet further comprising a first cooling circuit having means for bleeding air from the flow delivered by the compressor, a heat exchanger situated radially outside the combustion chamber, and means for directing the cooled air through the stationary blades of the distributor in order to cool the moving wheel of the turbine, wherein the bleed means bleed the flow of air from the zone of the end of the combustion chamber that surrounds the diffuser, and further comprising a second circuit for cooling the stationary blades of the distributor which bleeds air from the diffuser.

4. A turbojet according to claim 3, further comprising a channel beneath the combustion chamber to bring a fraction of the flow of air passing through the distributor towards the last stage of the compressor.

* * * * *